United States Patent Office 3,469,220
Patented Sept. 23, 1969

3,469,220
CORELESS HIGH VOLTAGE ELECTRICAL REACTOR
Lev Alexandrovich Mastrjukov, 13 Parkovaya ulitsa 40/2, kv. 36, Moscow, U.S.S.R.
Filed June 5, 1967, Ser. No. 643,599
Int. Cl. H01f 27/26
U.S. Cl. 336—210          7 Claims

ABSTRACT OF THE DISCLOSURE

An electrical reactor without a magnetic core, in which C-shaped shunts of a magnetic system externally embrace a winding in symmetrical disposition about the axis of the winding, a high voltage input being coaxially mounted inside the winding and extending through a central opening formed by the shunts. The shunts are constituted of sheets of electrical steel including portions extending parallel to the winding axis and end portions bent towards the middle plane of the shunt and formed by groups of sheets in each of which the sheet length decreases from the outside to the inside, whereby the shunt ends are of approximately trapezoidal shape.

---

The present invention relates to electric reactors and more particularly to high voltage electric reactors, preferably shunting ones, designed to compensate the capacitance power of main power lines.

Known in the prior art are reactors made in the form of coils without ferromagnetic cores, inserted into special magnetic systems to canalize the magnetic flux.

These reactors, however, suffer the following disadvantages: irrational consumption of electrical steel; complexity of the magnetic system construction; structural complexity of insulation; and insufficient reliability of the construction as to vibrations.

An object of the present invention is to eliminate the above-said disadvantages.

The principal object of the invention is to provide an economical electric reactor, simple in construction and reliable in operation at high voltages.

According to the invention this object is achieved due to the fact that in the electrical reactor without a magnetic core with an external magnetic system designed to canalize the magnetic flux, the magnetic shunts of the external magnetic system are made C-shaped enveloping the reactor winding from outside and are disposed symmetrically about the winding axis.

Moreover, the reactor high voltage input bushing is mounted inside the winding co-axially with the outlet through the central opening formed by the C-shaped shunts.

The plane of sheets of electrical steel from which the shunts are made is parallel to the plane of the shunt symmetry, passing through the winding axis.

It is expedient to make the ends of the C-shaped shunts from sheets of different length, bent towards the middle plane of the shunt so as to form a figure approximating a trapezoid.

The ends of the C-shaped shunts rest upon a frame consisting of rigid insulating longitudinal rods subdivided along the length and bound along the circumference with transverse insulating rings, while when no frame is employed, each C-shaped shunt is composed of two component parts, an L-shaped and a straight one.

The invention will be described hereinafter in conjunction with an exemplary embodiment thereof as illustrated in the attached drawings, in which.

Figure 1:
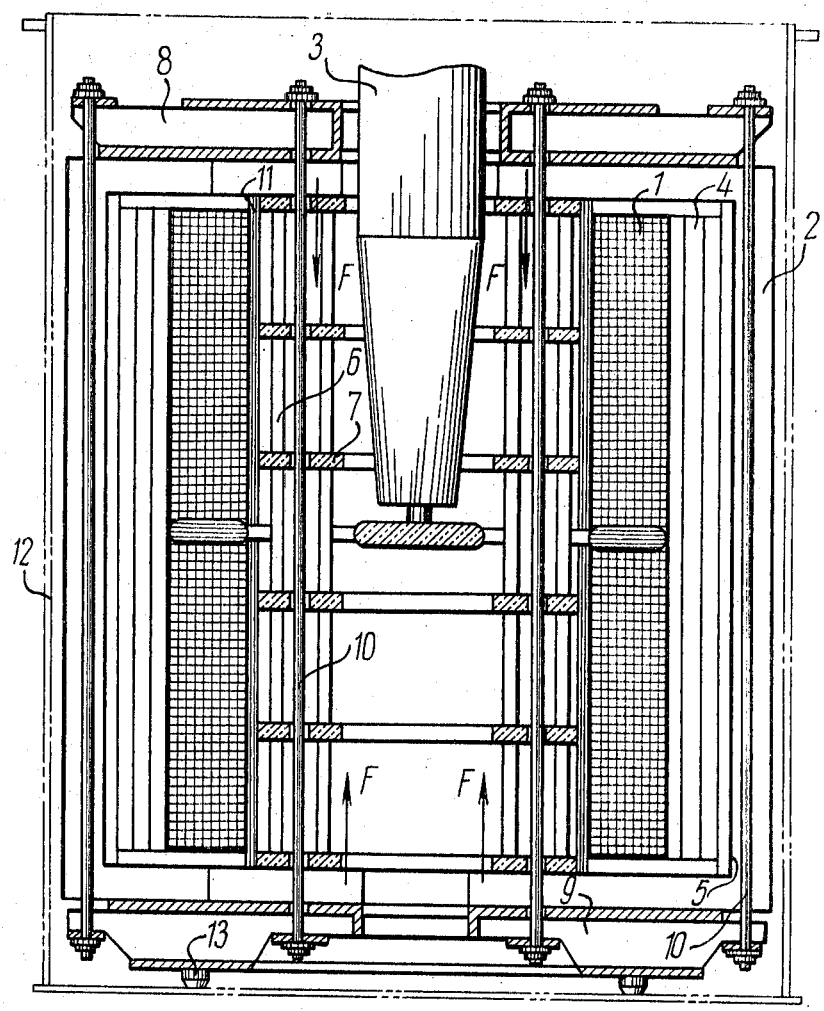
FIGS. 1 and 2 represent an embodiment of the reactor of the invention, having a frame inside the winding.
Figure 2:
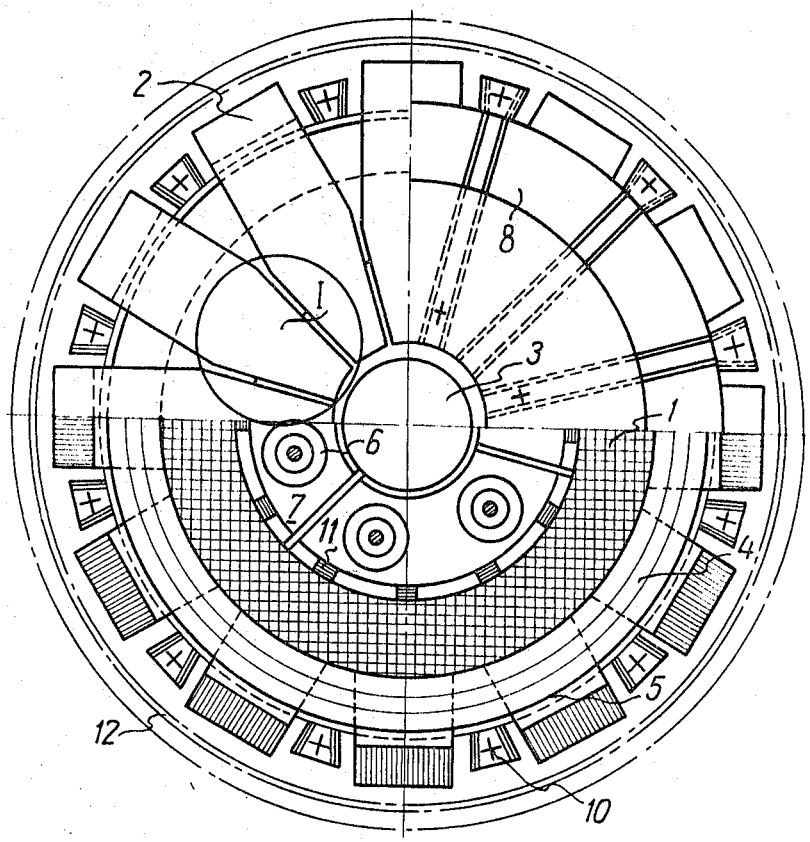

As can be seen in FIGS. 1 and 2, circular cylindrical winding 1 is surrounded by C-shaped magnetic shunts 2 embracing it from outside and disposed symmetrically about the axis of the winding 1. The shunts 2 are composed from sheets of electrical steel in such a manner that the plane of the sheets is parallel to the middle plane of the shunt 2 (the plane of shunt symmetry), which passes through the axis of the winding 1. The winding 1, of the disc or continuous type, has a line wire in the middle of its height and grounded ones at its ends. The high voltage capacitor input bushing 3 is arranged inside the winding 1, coaxially with the outlet through the central opening, and is thus disposed vertically so that the edge of the zero plate thrusts against the upper edge of the winding 1, whereas the edge of the line plate is resting against the middle of the winding 1. The potentials of points of the winding and those of the ends of plates lying in the same horizontal plane are approximately identical.

The main insulation 4 between the winding 1 and the vertical portions of the shunts 2 is of the oil or cable type. To equalize the electrostatic field use is made of electrostatic screens 5 mounted in corners of the shunts. To reduce vibrations inside the winding 1 there is provided a frame consisting of rigid insulating longitudinal rods 6 (made, for example, of porcelain) subdivided along the length and bound along the circumference with transverse insulating rings 7 for greater rigidity. The ends of the C-shaped shunts 2 are rigidly pressed against the frame by the aid of an upper plate 8 and a lower one 9 and coupling studs 10 located inside or outside the winding. In such a case the electromagnetic forces F are absorbed by the frame; no bending moments and vibrations of the magnetic system practically occur.

For the accurate mounting of the winding 1 use is made of guiding wedges 11 attached to the insulating rings 7. With the aim of vibration insulation the reactor active part (the winding with the magnetic system) is mounted in a circular tank 12 on spring shock absorbers 13.

Figure 3:
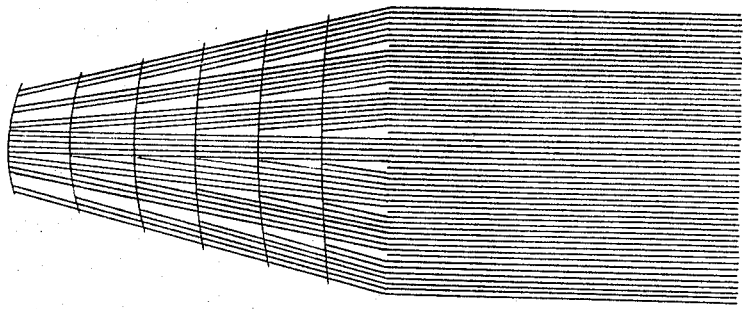
FIG. 3 shows the end of the C-shaped shunt of the invention.

As seen in FIG. 3 the ends of the C-shaped shunts are made in the form of a figure approximating a trapezoid. To this effect the horizontal portions of the C-shaped shunts are assembled from a great number of identical groups of sheets of different length and then formed by bending and cementing in a special device. Such a continuous transition of the straight portion of the shunt into a trapezoidal one insures the uniform distribution of the inductance along the shunt, the largest closing of the winding opening with the least consumption of the electrical steel.

Figure 4:
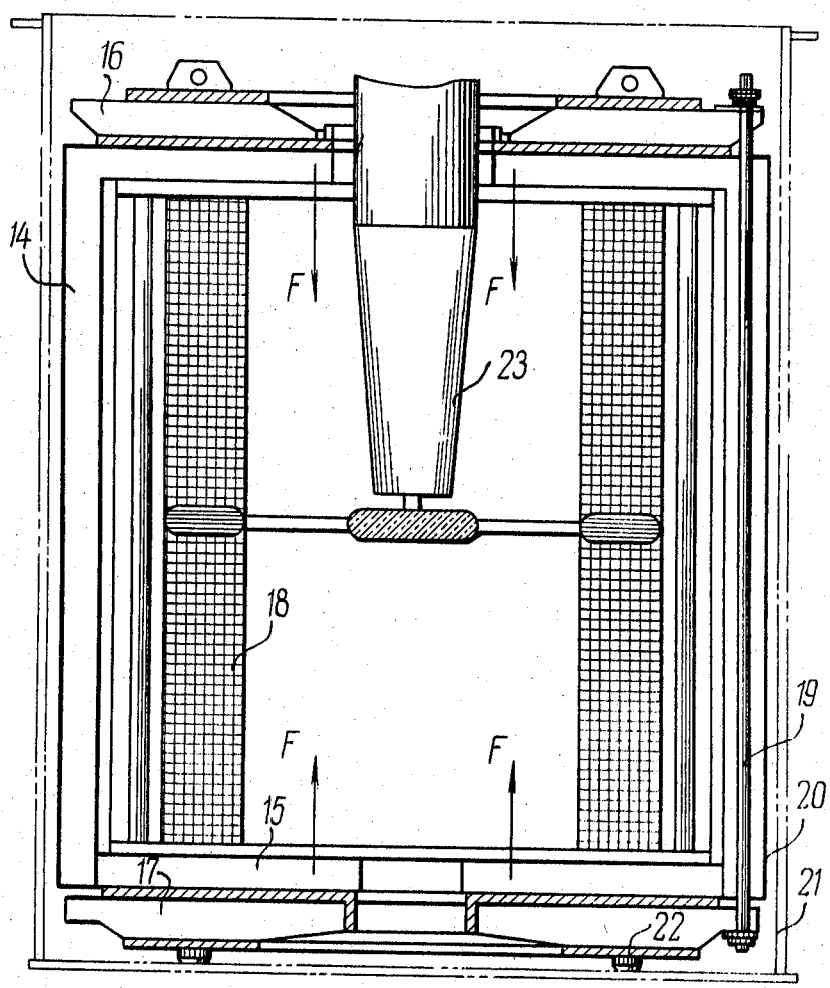
FIGS. 4 and 5 represent another embodiment of the reactor of the invention whose magnetic system is subdivided into two parts.
Figure 5:
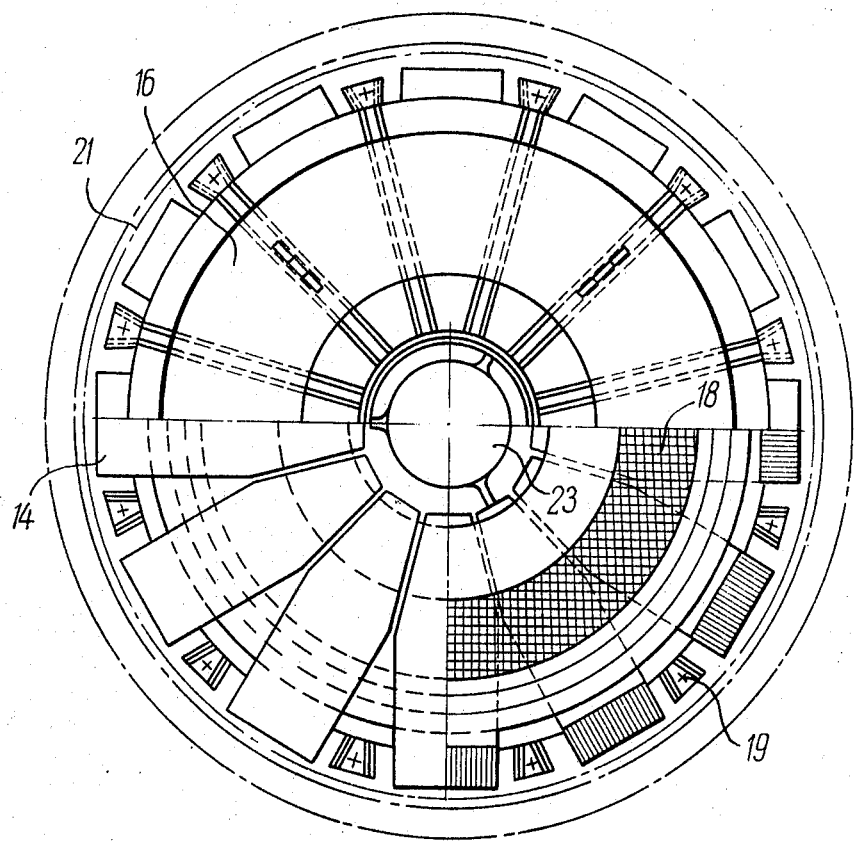

Another embodiment of the electric reactor in which advantage is taken of the winding as of the support for the magnetic system is shown in FIGS. 4 and 5. In such a case the C-shaped shunts are subdivided into two component parts: an angle part 14 and a straight one 15. To facilitate the assembling the angle parts 14 of the shunt are attached to the supporting plate 16, thereby forming a "bell," while the straight parts 15 are attached to the plate 17. The winding 18 is mounted on the plate 17 with the straight parts 15 fastened thereto and is covered from above by the "bell." Then the winding 18 is braced with both parts of the magnetic system by studs 19. At the place of the joint, provision is made for a tight bolted joint 20 for both parts of the shunt. In the bolted state the electromagnetic forces are accepted by the winding 18 which plays the same role as the frame shown in FIGS. 1 and 2, i.e., it reduces the magnitude of the vibration by reducing the bonding moment which affects the magnetic system.

Said joint permits the provision of the additional pressing of the winding 18 in case of its contraction during servce. The reactor active portion is arranged inside the tank 21 on the spring shock absorbers 22. The high voltage input bushing 23 is mounted in an opening formed by the plate 16 and the angle part 14 of the shunt inside the winding 18 and coaxially thereto.

The proposed reactor has the following advantages as compared with the known ones.

The magnetic system made of separate C-shaped magnetic shunts arranged symmetrically and having a trapezoidal shape at its ends, permits the obtaining of the uniform distribution of the magnetic flux both in the section of a single shunt and between the adjacent shunt; contributes for the least consumption of the electrical steel; makes it possible to obtain a sufficient space for placing structural parts, coupling studs, low voltage outputs, etc. with the maximum closing of the inner winding opening.

The presence of the central openings formed by the magnetic shunts makes the inner volume of the winding accessible, which may be used, for example, for the directed circulation of oil or for mounting the high voltage input.

The assembling of the high voltage input bushing inside the winding, coaxially with it, combined with the winding style, "the input in the middle" permits the largest possble simplification of the construction of the insulation between the input and winding as well as between the winding and magnetic system.

The design of the tank is considerably simplified and its weight is reduced due to the circular shape of the tank active portion.

What is claimed is:

1. An electric reactor without a magnetic core, comprising a winding, an outer magnetic system to canalize the magnetic flux including shunts having a C-shaped form externally embracing said winding and disposed symmetrically about the axis of said winding, and a high voltage bushing coaxially mounted inside said winding and extending through a central opening formed by said shunts, said shunts being constituted of sheets of electrical steel including portions extending parallel to the winding axis, and end portions bent towards the middle plane of the shunt, said sheets being arranged in groups in which the sheets in each group decrease in length from the outside to the inside thereby to form shunt ends of approximately trapezoidal shape.

2. An electric reactor according to claim 1 comprising a frame constituted of rigid insulating rods subdivided along the length supporting the ends of the C-shaped shunts and transverse insulating rings circumferentially binding the shunts.

3. An electric reactor according to claim 1 in which each C-shaped shunt is composed of two component parts, one being an angle part and the other a straight one.

4. A shunt reactor of the coreless type comprising a winding with a high voltage bushing, a ferromagnetic shield externally surrounding said winding to canalize the magnetic flux, said ferromagnetic shield including C-shaped magnetic shunts which externally embrace said winding and include opposite ends and rigid longitudinal nonmagnetic rods passing inside said winding and clamped between the ends of said C-shaped shunts, said high voltage bushing including a lower portion disposed coaxially inside said winding and passing outside through a center opening which is formed by said C-shaped magnetic shunts.

5. A reactor as claimed in claim 4 in which the longitudinal nonmagnetic rods are subdivided in length and rigid nonmagnetic rings are provided to clamp said rods along the circumference thereof.

6. A reactor as claimed in claim 4 in which said high voltage bushing is disposed relative to the winding such that the edges of the conductng linings of said bushing and those of the winding turns are disposed in a common plane extending perpendicular to the axis of said winding and the potentials at said edges are approximately of the same value.

7. A reactor as claimed in claim 4 in which the ends of the C-shaped shunts comprise a plurality of identical stacks of electrical steel sheets bent towards the middle plane of the shunt, the length of the sheets in each stack varying gradually from sheet to sheet to form ends of trapezoidal shape.

References Cited

UNITED STATES PATENTS

| 2,531,697 | 11/1950 | Meyerhans | 336—212 XR |
| 3,082,389 | 3/1963 | Settles et al. | 336—175 XR |

FOREIGN PATENTS

| 845,981 | 8/1952 | Germany. |
| 27,873 | 12/1909 | Sweden. |
| 1,418,855 | 10/1965 | France. |

LEWIS H. MEYERS, Primary Examiner

T. J. KOZMA, Assistant Examiner

U.S. Cl. X.R.

336—212, 234